Figure 1:
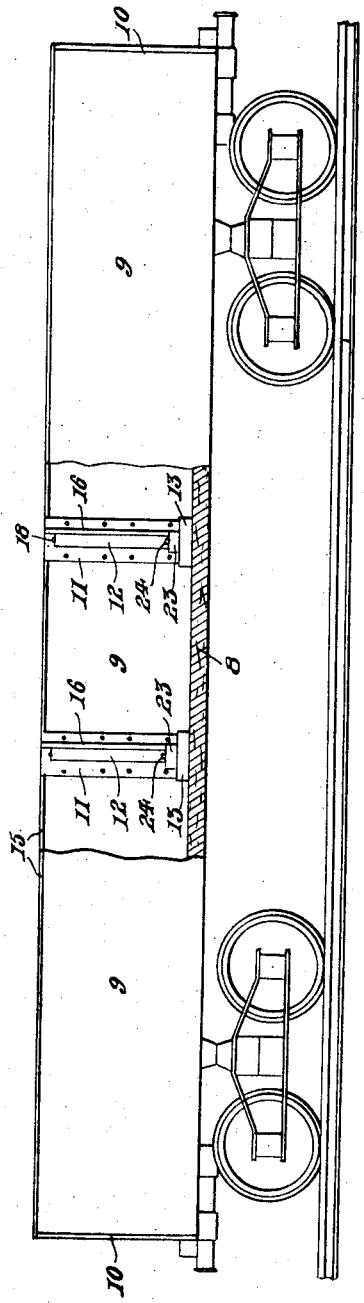

J. ORAVEC.
FREIGHT CAR.
APPLICATION FILED MAR. 5, 1920.

1,344,243.

Patented June 22, 1920.
2 SHEETS—SHEET 1.

Inventor
J. Oravec

By A. M. Wilson
Attorney

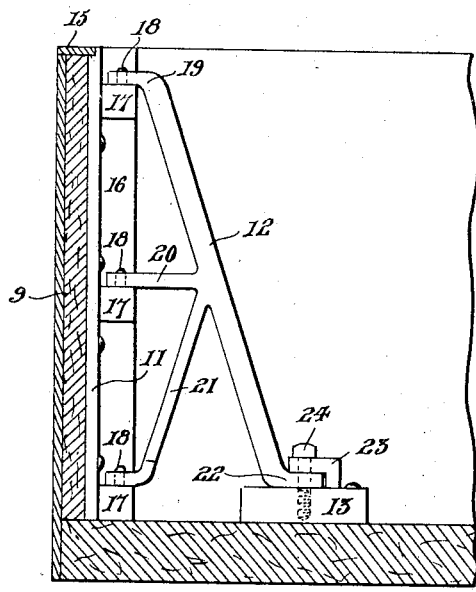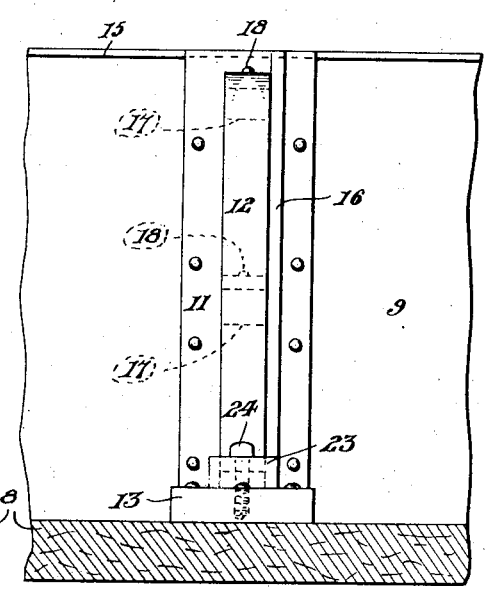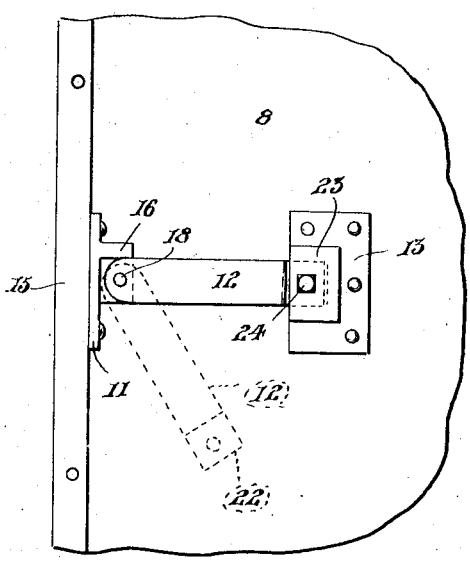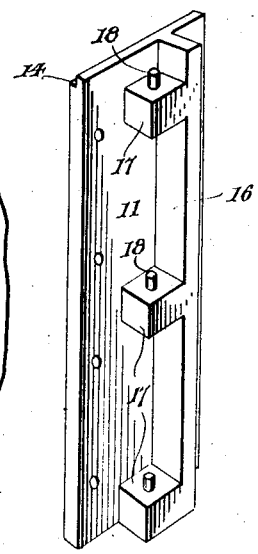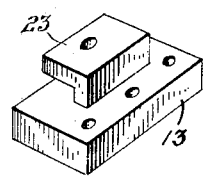

UNITED STATES PATENT OFFICE.

JOHN ORAVEC, OF GALETON, PENNSYLVANIA.

FREIGHT-CAR.

1,344,243.   Specification of Letters Patent.   Patented June 22, 1920.

Application filed March 5, 1920.   Serial No. 363,425.

*To all whom it may concern:*

Be it known that I, JOHN ORAVEC, a citizen of Czecho-Slovakia, residing at Galeton, in the county of Potter and State of Pennsylvania, have invented certain new and useful Improvements in Freight-Cars, of which the following is a specification.

The present invention relates to certain new and useful improvements in freight cars and has particular reference to a freight car provided with collapsible or removable sides and end walls, coöperating brace and lock devices therefor being carried by the side and end walls of the freight car and the bottom thereof.

With the above and other objects in view, the invention consists in the novel form, combination and arrangement of parts herein fully described and shown in the accompanying drawings, wherein like reference characters indicate similar parts throughout the several views.

Figure 2:
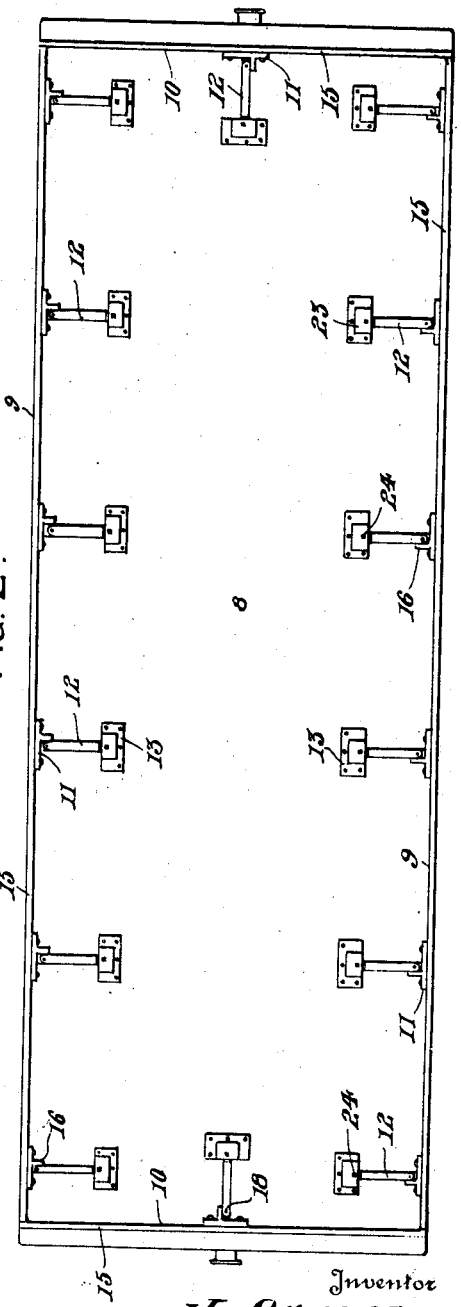

In the drawings,

Figure 1 is a side elevational view of a freight car constructed in accordance with the present invention, a portion of the side wall thereof being broken away, Fig. 2 is a top plan view showing the brace members connecting the side and end walls to the car bottom, Fig. 3 is a fragmentary sectional view of a portion of the freight car, showing in side elevation, one of the brace devices, Fig. 4 is a view similar to Fig. 3 showing one of the brace devices in front elevation, Fig. 5 is a fragmentary top plan view of one of the braces with the same moved to its disconnecting position as illustrated by dotted lines, Fig. 6 is a perspective view of one of the brace-engaging plates removed from the car, and Fig. 7 is a perspective view of one of the supporting blocks for a brace removed from the car.

The present invention having particular reference to a freight car provided with removable side and end walls, the invention consists in mounting upon the inner faces of the side and end walls supporting brackets to which brace bars are adapted to be removably pivotally connected while blocks attached to the floor of the car are adapted to have the swinging brace bars locked thereto whereby the side and end walls of the car are rigidly connected to the bottom thereof.

Referring more in detail to the accompanying drawings and particularly to Figs. 1 and 2, there is illustrated a freight car embodying a bottom 8 and removable side and end walls 9 and 10 respectively, the side and end walls being maintained in rigid relation with respect to the bottom 8 by brace devices embodying a plurality of brackets 11 secured to the side and end walls of the car and having removably hinged thereto braces 12 that are adapted to be locked to blocks 13 carried by the floor 8 of the car.

The detail construction of the bracket 11 is shown more clearly in Fig. 6 and embodies a flat plate having a series of bolt-receiving openings therein by which said bracket plate is secured to the side and end walls 9 and 10 of the car. The upper edge of the bracket 11 is recessed as at 14 to provide a seat for the upper strips 15 positioned upon the upper edges of the side and end walls as shown in Figs. 3 and 4. A vertical rib 16 projects from the inner face of the bracket plate 11 adjacent one vertical edge thereof and is provided with lateral spaced block lugs 17 carrying centrally disposed studs 18, preferably three lugs being carried by each rib and substantially in the spaced relation as illustrated. The brackets 11 being of cast material, provides an integral construction of the several parts described.

The brace 12 as shown in Figs. 3 to 5 embodies an inclined bar having an apertured angular extension 19 for reception on the uppermost stud 18. A horizontal arm 20 and a depending arm 21 projects from the outer central face of the brace bar 12 and are adapted for pivotal reception upon the intermediate and lower studs 18, respectively, whereby the brace bar 12 is pivotally supported upon the vertically alined lug studs 18.

With the car sides and ends 9 and 10 provided with the brace bars 12, and it being desired to rigidly connect the side and end walls to the car bottom 8, the lower angular extensions 22 upon the brace bars 12 are moved to a position as illustrated to rest upon the blocks 13 and to underlie the overhanging angular flange 23 upon said blocks with bolts 24 passing through alined openings in the angular flange, bar extension 22 and block 13, thus rigidly connecting the sides and ends of the car to the bottom thereof.

From the above detailed description, it is thought that the construction and operation of the device will at once be apparent, it being noted that in order to remove the side or end walls of the car, it is only necessary to remove the bolts 24 from the blocks 13 to permit a horizontal swinging movement of the brace bars 12 to free the same from the block flanges 23, at which time the brace bars may be removed from the brackets 11 by vertically shifting the same for disconnection with the lug studs 18, whereupon the side or end walls of the car may be removed for any purpose desired such as for loading or unloading of a car.

While there is herein shown and described the preferred embodiment of the invention, it is nevertheless to be understood that minor changes may be made therein without departing from the spirit and scope of the invention as claimed.

What is claimed as new is:

1. A freight car of the type described comprising a bottom, removable side and end walls, means extending between the walls and bottom for rigidly connecting the same, said means including a plurality of brackets fixed to said walls, a plurality of blocks fixed to the bottom, and connecting means pivoted to said brackets and detachably connected to said blocks.

2. A freight car of the type described comprising a bottom, removable side and end walls, means extending between the walls and bottom for rigidly connecting the same, said means including a plurality of brackets fixed to said walls, a plurality of blocks fixed to the bottom, and horizontally swinging brace bars pivoted to said brackets and adapted to be fixed to said blocks.

3. A freight car of the type described comprising a bottom, removable side and end walls, means extending between the walls and bottom for rigidly connecting the same, said means including a plurality of brackets fixed to said walls, a plurality of blocks fixed to the bottom, a plurality of stud carrying lugs carried by said brackets, horizontally swinging brace bars pivotally mounted on said studs and adapted to be fixed to said blocks.

4. A freight car of the type described comprising a bottom, removable side and end walls, means extending between the walls and bottom for rigidly connecting the same, said means including a plurality of brackets fixed to said walls, a plurality of blocks fixed to the bottom, brace bars removably pivotally supported on said brackets, the lower ends of said brace bars adapted to be positioned upon said blocks and means carried by said blocks adapted for engagement with the lower ends of said brace bars to maintain the brace bars fixed to said blocks.

In testimony whereof I affix my signature.

JOHN ORAVEC.